United States Patent
Liu

(10) Patent No.: US 7,801,151 B2
(45) Date of Patent: Sep. 21, 2010

(54) METHOD AND APPARATUS FOR FORWARDING SERVICE IN A DATA COMMUNICATION DEVICE

(75) Inventor: Shaowei Liu, Guangdong Province (CN)

(73) Assignee: Huawei Technologies Co., Ltd., Shenzhen (CN)

(*) Notice: Subject to any disclaimer, the term of this patent is extended or adjusted under 35 U.S.C. 154(b) by 236 days.

(21) Appl. No.: 11/971,119

(22) Filed: Jan. 8, 2008

(65) Prior Publication Data
US 2008/0107114 A1 May 8, 2008

Related U.S. Application Data

(63) Continuation of application No. PCT/CN2006/001194, filed on Jun. 2, 2006.

(30) Foreign Application Priority Data
Jul. 8, 2005 (CN) .................... 2005 1 0082807

(51) Int. Cl.
*H04L 12/28* (2006.01)
*H04L 12/56* (2006.01)
(52) U.S. Cl. .................. 370/395.32; 370/395.7
(58) Field of Classification Search ........ None
See application file for complete search history.

(56) References Cited

U.S. PATENT DOCUMENTS

| | | | |
|---|---|---|---|
| 6,339,595 B1 | 1/2002 | Rekhter et al. | |
| 6,636,516 B1 | 10/2003 | Yamano | |
| 6,888,838 B1 | 5/2005 | Ji et al. | 370/401 |
| 7,035,256 B1* | 4/2006 | Neufeld et al. | 370/389 |
| 7,489,681 B1* | 2/2009 | Aggarwal et al. | 370/389 |
| 2002/0002549 A1* | 1/2002 | Lunteren | 707/2 |
| 2002/0067725 A1 | 6/2002 | Oguchi et al. | |
| 2003/0058860 A1* | 3/2003 | Kunze et al. | 370/392 |

FOREIGN PATENT DOCUMENTS

| | | |
|---|---|---|
| CN | 1441579 A | 9/2003 |
| CN | 1529454 A | 9/2004 |
| WO | 9914906 A1 | 3/1999 |
| WO | 02078250 A2 | 10/2002 |

OTHER PUBLICATIONS

Rosen, et al., "BGP/MPLS VPNs," pp. 1-25 (Mar. 1999).

* cited by examiner

*Primary Examiner*—Gregory B Sefcheck
*Assistant Examiner*—Suk Jin Kang
(74) *Attorney, Agent, or Firm*—Finnegan, Henderson, Farabow, Garrett & Dunner LLP

(57) ABSTRACT

A method for forwarding service in the data communication device and the forwarding apparatus, said apparatus includes a memory unit and a forwarding unit, wherein storing the Route Prefix, the private data of the Route Prefix and the corresponding Next Hop Array; said forwarding unit forwards the service at the data communication device according to said private data and the Next Hop corresponding with the Route Prefix. Using the present invention, it can implement the corresponding different a process for the different Prefix while the data communication device is forwarding service. It also may constitute a new-style FIB using the present invention, accordingly not only improve the updating speed of FIB, save the internal memory of the data communication device, but also satisfy the requirement that the different Prefixes need to have the different private domains with some specific functions.

15 Claims, 4 Drawing Sheets

FIB Table

| Prefix | Next Hop Array | | |
|---|---|---|---|
| IPv4 Prefix 1 | NextHop 1 | NextHop 2 | NextHop 3 |
| IPv4 Prefix 2 | NextHop 1 | NextHop 4 | |
| IPv4 Prefix 3 | NextHop 3 | | |
| IPv4 Prefix 4 | NextHop 5 | | |

Fig. 1 (Prior Art)

METHOD AND APPARATUS FOR FORWARDING SERVICE IN A DATA COMMUNICATION DEVICE

The present application is a continuation application of PCT application No. PCT/CN2007/001194, filed on Jun. 2, 2006, entitled "A METHOD FOR FORWARDING SERVICE OF THE DATA COMMUNICATION DEVICE AND THE FORWARDING APPARATUS", which is incorporated by reference herein in its entirety.

TECHNICAL FIELD OF THE INVENTION

The present invention relates to the field of communications, and in particular, to a method and apparatus for forwarding a service in a data communication device.

BACKGROUND OF THE INVENTION

A data communication device, such as a router, usually includes a control plane and a data plane. The control plane is responsible for functions such as routing information collection, routing computation, device management and network management agent. The data plane is also referred to as service plane or forwarding plane and it is responsible for functions such as network flow receiving, path selecting, sending and special service processing.

During the practical forwarding of an IP service, the control plane collects various routing information from other devices via a protocol packet, screens the collected various routing information, and establishes an optimum path information base, then forms a fast forwarding table (FIB) and issues the FIB to the data plane. The FIB is equivalent to a routing map for fast lookup, which is the basis for the data plane to forward information. For all the IP services on the network, a next station to the destination is determined by looking up the FIB via the data plane. Therefore, the FIB is a key data structure for the data plane of the data communication device. The quality of this FIB model would directly influence forwarding efficiency and design complexity of the data plane, thereby influencing performance and reliability of the data communication device.

The FIB is usually looked up according to a destination IP address of an IP packet to be forwarded, and main information looked up is information of a next hop device, for example, the IP address and outgoing interface of the next hop, etc.

A typical FIB model in the prior art is a unified table model. FIG. 1 is a schematic diagram of this model. In this model, a prefix corresponds to a Next Hop Array, and a Next Hop Array may include a plurality of equivalent routings. A load sharing relationship exists between these equivalent routings and the flow of looking up the routing is shared by the plurality of equivalent routings via a special algorithm.

The above prefix refers to an IP address comprising a subnet mask. For example, the prefix may be 1.1.1.1/24; in other words, the IP address is 1.1.1.1 and the subnet mask is 24. Because the lookup of the FIB employs a principle of Longest Prefix Matching. Therefore, an IP packet with the destination IP address of 1.1.1.* corresponds to the same Next Hop Array.

A characteristic of the unified table model lies in that each prefix corresponds to a Next Hop Array, and if a next hop exists in the Next Hop Arrays of a plurality of prefixes, the next hop has several copies at the same time, for example, NextHop1 and NextHop3 as shown in FIG. 1. Therefore, in this model, if a prefix is matched, the Next Hop Array corresponding to the prefix may be obtained at once, without the need to look up other tables.

The above unified table model has the following disadvantages.

1) The space occupied is large. Because the number of prefixes of the present backbone router may reach above 200 thousand, the number of next hops is usually tens to more than one hundred. Therefore, in this model, the content of the same next hop may be copied for tens of thousands of times, and a very large storage space needs to be occupied.

2) The updating speed is low. Updating speed of routing is a key index for measuring a communication device. Because in this model the same next hop has many copies, when a failure occurs in the next hop, the routing protocol needs to spend a long time in deleting all the information of the next hop. As a result, communication traffic between the control plane and the data plane will be increased greatly, sending and receiving other data will be influenced, and the number of lost packets will be increased. During this time period, all the packets that pass through this path might continue to be transmitted on the wrong routing because the routing is not refreshed in time, so that the packets may be discarded. Similarly, when a next hop recovers from a failure, all the related table entries of the next hop will be added again, and this will also cause the communication traffic between the control plane and the data plane to be increased greatly.

Another typical FIB model in the prior art is a scatter table model. This model is put forward by Network Processing Forum (NPF) during 2003 to 2004. A schematic diagram of this model is as shown in FIG. 2.

In the scatter table model, the same Next Hop Array is kept in only one copy in a memory, and a next hop ID structure is added to a corresponding table entry in each prefix. This structure is merely a pointer, which occupies a very little space. A many-to-one correspondence exists between the prefix and the Next Hop Array. In this model, because a many-to-one correspondence is employed, the consumption of the memory will be decreased greatly. Additionally, during updating, only a next hop array needs to be updated, and the updating speed will be accelerated greatly.

A disadvantage of the above scatter table model lies in that the case where different prefixes may have their own private domains is not considered. In practical applications, when different prefixes correspond to the same next hop or next hop array, some private data, such as an inner layer label of a virtual private network of a Route Prefix, a QoS parameter or autonomous domain number information, needs to be kept respectively for different prefixes in many functions. Then, the data communication device may obtain these private data when a service is forwarded, and it may perform different corresponding processes on different prefixes. In the above scatter table model, such different processes cannot be realized.

SUMMARY OF THE INVENTION

In view of the above problems existed in the prior art, an object of the invention is to provide a method for forwarding a service in a data communication device, and thereby different corresponding processes may be performed for different prefixes when the data communication device forwards a service.

It is another object of the invention to provide an apparatus for forwarding a data communication service, thereby different corresponding processes may be performed for different prefixes when a data communication device forwards a service.

For the realization of the above objects, technical solutions of the invention are as follows.

A method for forwarding a service in a data communication device, includes:

A) saving a Route Prefix, private data of the Route Prefix and a corresponding Next Hop Array in the data communication device; and B) forwarding a service in the data communication device according to the private data and the next hop corresponding to the Route Prefix.

Preferably, step B further includes: adding a pointer to the Route Prefix to which the private data are added, wherein the pointer points to the Next Hop Array saved in a memory, which corresponds to the Route Prefix, and only one copy of the Next Hop Array is saved; and constituting an FIB from the Route Prefix and the Next Hop Array, which is queried by the data communication device for forwarding the service.

Preferably, step B further includes: adding a flag bit to the pointer of each Route Prefix, wherein it is determined whether to use the added private data according to the value of the flag bit.

Preferably, step A includes: adding a private domain to the Route Prefix of the data communication device, and saving the private data of the Route Prefix by using the private domain.

Preferably, step A further includes: adding a pointer to the Route Prefix of the data communication device, adding a flag bit to the pointer, determining whether or not to add a private domain to each Route Prefix according to the value of the flag bit, and saving the private data of the Route Prefix by using the private domain.

Preferably, step B specifically includes: obtaining, by a data plane of the data communication device, the private data of each Route Prefix and the Next Hop Array corresponding to the Route Prefix that are saved, and forwarding a service according to the information obtained, when the data communication device forwards the service.

Preferably, the private data includes an inner layer label of a virtual private network of the Route Prefix, a QoS parameter, or autonomous domain number information.

Preferably, the data communication device is a router.

A forwarding apparatus for forwarding a data communication service, which is disposed in a data communication device, includes:

a storage unit for saving a Route Prefix, private data of the Route Prefix and a corresponding Next Hop Array; and a forwarding unit for querying the private data and the Next Hop Array corresponding to the Route Prefix from the storage unit and forwarding a service in the data communication device according to the query result.

Preferably, a part of the storage unit is a memory of the data communication device, and the Next Hop Array is saved in only one copy in the memory; in the storage unit, a pointer is further included in the Route Prefix to which the private data is added, which points to the Next Hop Array saved in the memory and corresponding to the Route Prefix; and the forwarding unit queries the corresponding Next Hop Array in the memory according to the pointer of the Route Prefix.

Preferably, the pointer of each Route Prefix in the storage unit further includes a flag bit for identifying whether to use the added private data or not.

Preferably, the Route Prefix of the storage unit includes a private domain for saving the private data.

Preferably, each Route Prefix in the storage unit further includes a pointer which further includes a flag bit for identifying whether to use the added private data or not.

Preferably, the private data includes an inner layer label of a virtual private network of the Route Prefix, a QoS parameter, or autonomous domain number information.

It can be seen from the above technical solutions of the invention that, in the invention, different corresponding processes may be performed for different prefixes when the data communication device forwards a service, by adding a private domain to each Route Prefix of the data communication device and saving private data of the Route Prefix using the private domain. Moreover, according to the invention, the private domain added to the Route Prefix, in conjunction with a scatter table model, may constitute a novel FIB, so that not only the updating speed of the FIB can be improved, the memory of the data communication device can be saved, but also the requirement of some special functions that different prefixes need to have different private domains can be met.

BRIEF DESCRIPTION OF THE DRAWINGS

FIG. 1 is a schematic diagram of a unified table model according to the invention;

DETAILED DESCRIPTION OF THE EMBODIMENTS

The invention will now be further described in detail in conjunction with the accompanying drawings and specific embodiments.

The invention provides a method for forwarding a service in a data communication device (e.g. a router). The core of the invention lies in that, a Route Prefix, private data of the Route Prefix and a corresponding Next Hop Array are saved in a data communication device, and a service in the data communication device is forwarded according to the private data and the next hop corresponding to the Route Prefix.

In the invention, for the requirement of some special functions that different prefixes need to have different private domains, a private domain is added to each Route Prefix of the data communication device, which is used for saving the private data of the Route Prefix. Then, the data communication device forwards an IP service according to the private data and the next hop corresponding to the Route Prefix.

As a preferred embodiment of the invention, a private domain may be added to a Route Prefix based on a scatter table model in existing FIB models; a pointer is added to the Route Prefix to which a private domain is added, which points to the Next Hop Array saved in a memory and corresponding to the Route Prefix, wherein the Next Hop Array is saved in only one copy in the memory; and an FIB is formed from the Route Prefix and the Next Hop Array. A schematic diagram of the FIB model is as shown in FIG. 3.

Figure 2:
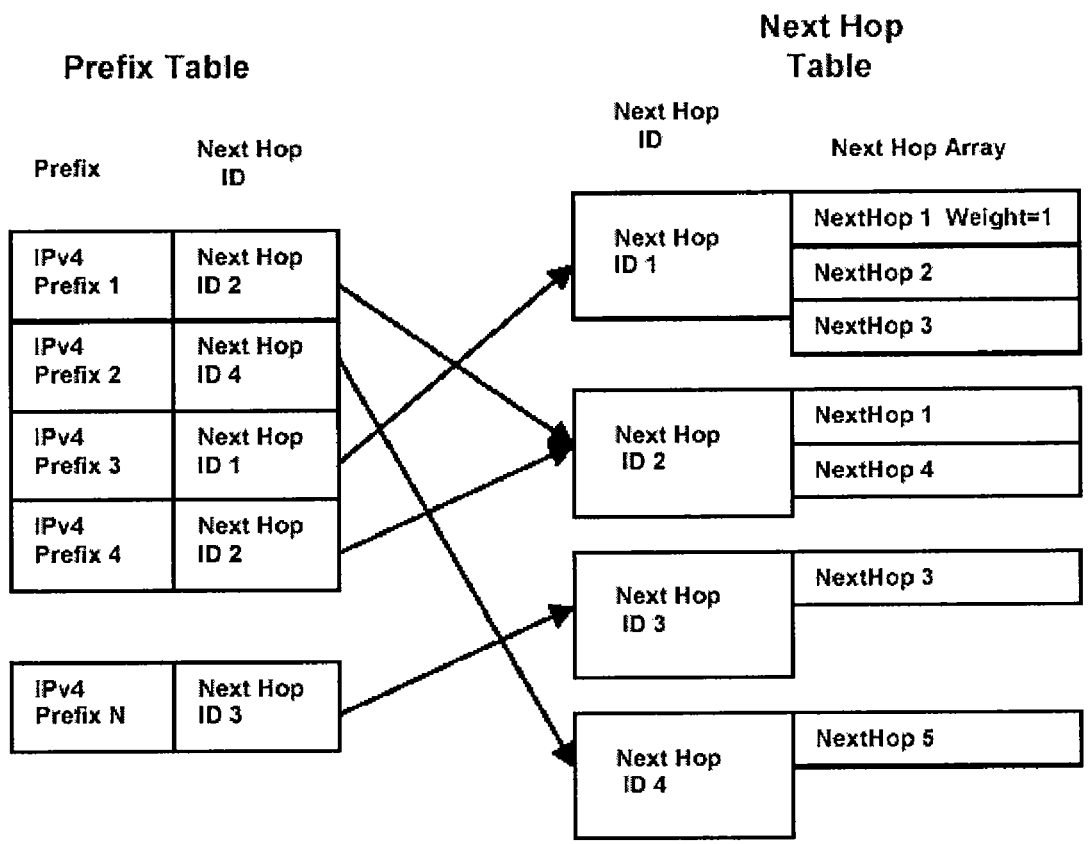
FIG. 2 is a schematic diagram of a scatter table model according to the invention.
Figure 3:
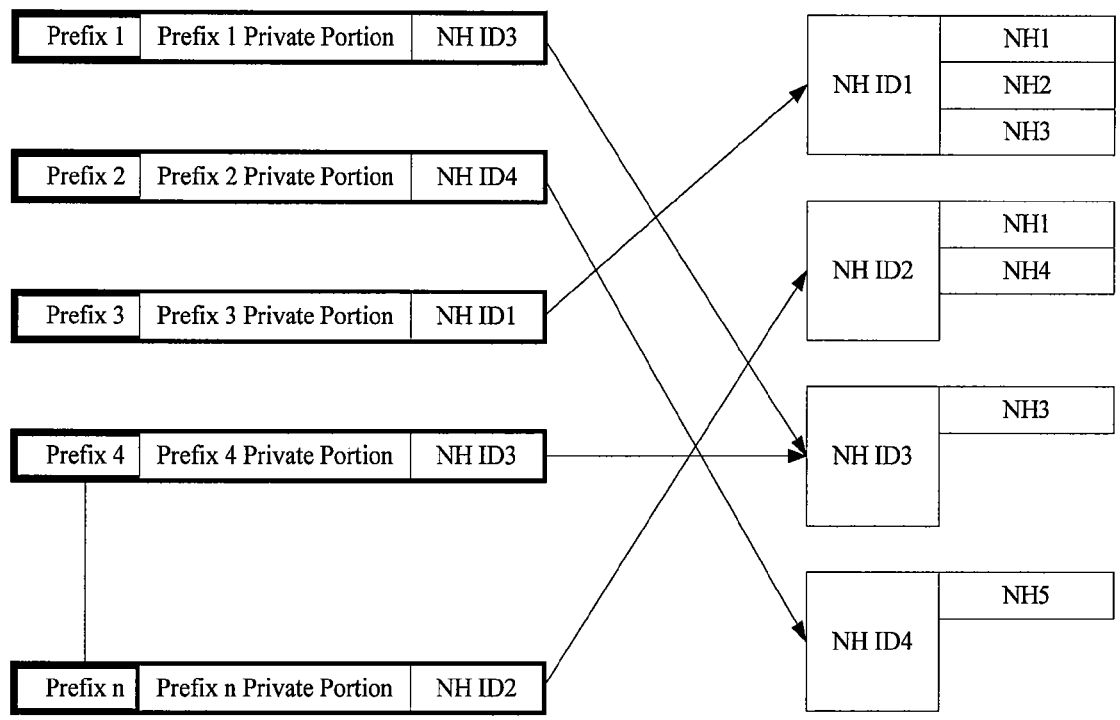
FIG. 3 is a schematic diagram of a novel FIB model according to the invention.

In the FIB model as shown in FIG. 3, for each of the prefixes comprising prefix 1, prefix 2, prefix 3, prefix 4, . . . and prefix N, in comparison with the scatter table model of the prior art, a private domain is added in addition to the next hop ID structure, i.e. Next Hop ID (NH ID). The NH ID structure is realized by a pointer. The private domain is prefix 1 private portion, prefix 2 private portion, prefix 3 private portion, prefix 4 private portion, . . . and prefix N private portion as shown in FIG. 3. The private domain added may identify some attributes unique to the prefix. Some private data of the prefix, such as an inner layer label of a virtual private network (VPN) and a QoS parameter, may be stored in the private domain.

The VPN usually has two layers of labels: inner layer label and outer layer label. Each VPN may have one inner layer label, while one outer layer label may be shared by a plurality of VPNs. The next hop of a VPN data packet is determined by its outer layer label, so although the next hops of several VPN data packets are identical, they belong to different VPNs and need to be identified by adding an inner layer label of each VPN to the private domain.

In practical applications, some different Route Prefixes may be found by the same routing protocol. Although the next hops of these Route Prefixes are the same, they may have different requirements on the QoS. Therefore, different QoS parameter indexes need to be saved in the private domain for different prefixes.

Autonomous domain number information used by a statistical function may also be saved in the private domain.

Therefore, the FIB model according to the invention can meet the requirement of some special functions that different prefixes need to have different private domains. When the data communication device forwards a service, a data plane of the data communication device obtains the private data of each Route Prefix and the Next Hop Array corresponding to the Route Prefixes that are saved, and forwards the service according to the information obtained.

The private domain according to the invention may have different designs in different cases. If hardware permits, the private domain may be designed as an optional part.

For example, a flag bit may be added to the next hop ID structure of each prefix for determining whether to add the private domain or not. If the flag bit is TRUE, the private domain will be added to each prefix; if the flag bit is False, the private domain will not be added to each prefix. Thus, the memory of the data communication device may be saved properly.

Alternatively, the private domain may be reserved for each prefix when the data communication device allocates the memory. Then, a pointer is added to each prefix. For example, in an embodiment based on the scatter table model, the existing pointer (i.e., the next hop ID structure) may be used, to which a flag bit is added for determining whether to use the private domain or not. If the flag bit is TRUE, the private domain will be used; if the flag bit is False, the private domain will not be used.

Figure 4:
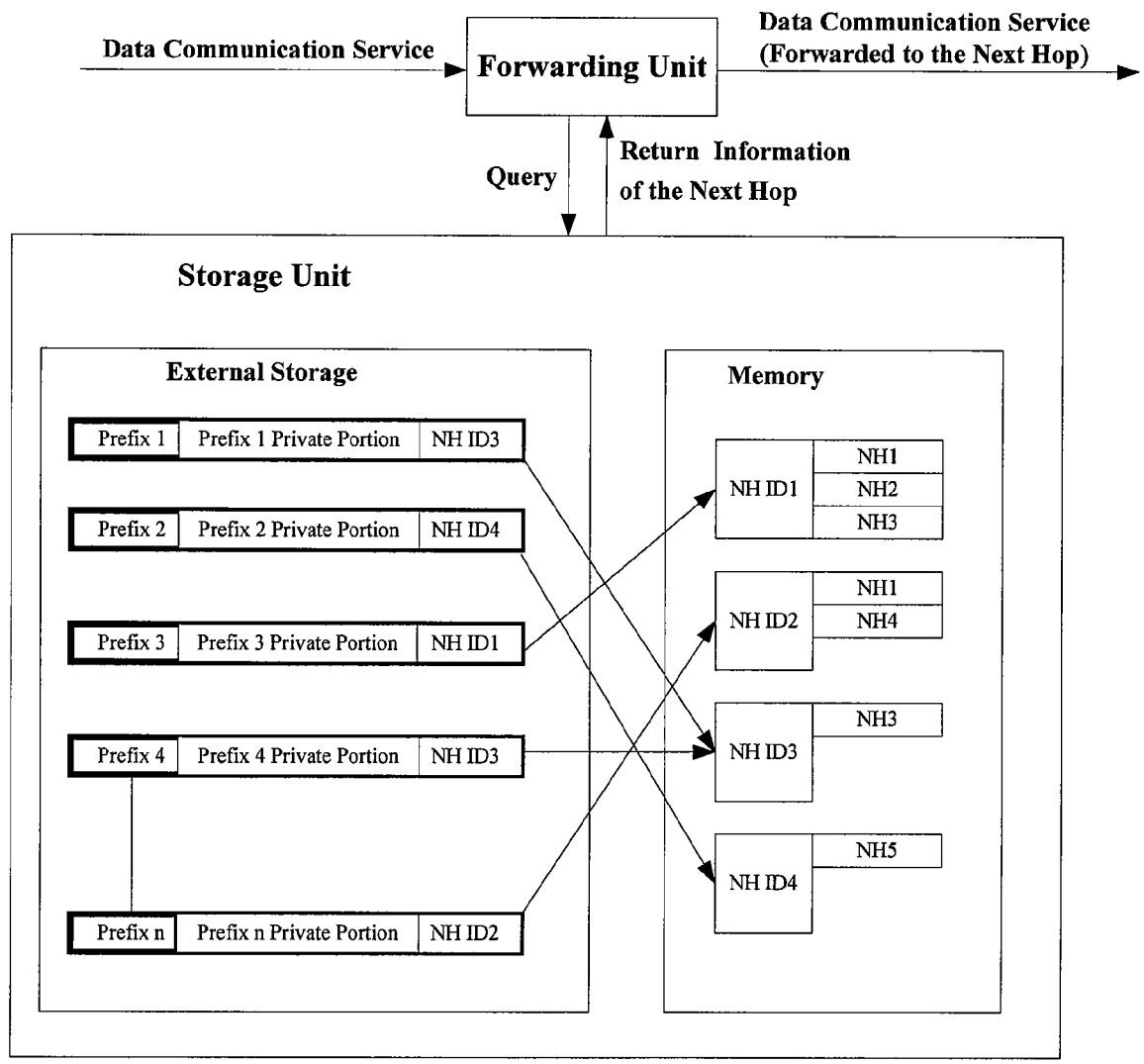
FIG. 4 is a schematic diagram of a forwarding apparatus for forwarding a data communication service according to the invention.

FIG. 4 is a schematic diagram of a forwarding apparatus for forwarding a data communication service according to the invention. Referring to FIG. 4, the forwarding apparatus is disposed in a data communication device and includes:

a storage unit for saving a Route Prefix, private data of the Route Prefix and a corresponding Next Hop Array, in which the Route Prefix in the storage unit may include a private domain for saving the private data; and a forwarding unit for querying the private data and the Next Hop Array corresponding to the Route Prefix from the storage unit and forwarding a service in the data communication device according to the query result.

As a preferred embodiment, a part of the storage unit is a memory of the data communication device, and the Next Hop Array is saved in only one copy in the memory; in the storage unit, a pointer (i.e. the next hop ID structure), which points to the Next Hop Array saved in the memory and corresponding to the Route Prefix, is further included in the Route Prefix to which the private data is added; and the forwarding unit queries the corresponding Next Hop Array from the memory according to the pointer of the Route Prefix.

Moreover, the pointer of each Route Prefix in the storage unit may further include a flag bit for identifying whether to use the added private data or not.

As another specific embodiment, each Route Prefix in the storage unit may include a pointer which may further include a flag bit for identifying whether to use the added private data or not.

The private data includes an inner layer label of a virtual private network of a Route Prefix, a QoS parameter, or autonomous domain number information.

The above are merely specific preferred embodiments of the invention; however, the invention is not limited to this. Any modification or variation which will readily occur to those skilled in the art without departing from the spirit of the invention falls into the protection scope of the invention as defined by the appended claims and their equivalents.

The invention claimed is:

1. A method for forwarding a service in a data communication device, comprising:

constituting a fast forwarding table, FIB, in the data communication device, the FIB comprising a Route Prefix, and a pointer pointing to a Next Hop Array corresponding to the Route Prefix;

wherein the pointer comprises a flag bit adapted to determine whether to add a private domain to the Route Prefix according to a value of the flag bit; wherein the private domain is adapted to save the private data of the Route Prefix;

if it is determined to add the private domain to the Route Prefix according to a value of the flag bit, querying, by a data plane of the data communication device, the private data of each Route Prefix and the Next Hop Array corresponding to the Route Prefix from the FIB, and forwarding a data packet in the data communication device according to a query result.

2. The method for forwarding the service in the data communication device according to claim 1, wherein only one copy of the Next Hop Array is saved.

3. The method for forwarding the service in the data communication device according to claim 1, wherein the private data comprises at least one of: an inner layer label of a virtual private network of a Route Prefix, a QoS parameter, and autonomous domain number information.

4. The method for forwarding the service in the data communication device according to claim 1, wherein the data communication device is a router.

5. A method for forwarding a service in a data communication device, comprising:

constituting a fast forwarding table, FIB, in the data communication device, the FIB comprising a Route Prefix, and a pointer pointing to a Next Hop Array corresponding to the Route Prefix;

wherein the pointer comprises a flag bit adapted to determine whether to use the private domain of the Route Prefix according to a value of the flag bit when a private domain has been reserved for each Route Prefix; wherein the private domain is adapted to save the private data of the Route Prefix;

if it is determined to use the private domain according to a value of the flag bit, querying, by a data plane of the data communication device, the private data of each Route Prefix and the Next Hop Array corresponding to the Route Prefix from the FIB, and forwarding a data packet in the data communication device according to a query result.

6. The method for forwarding the service in the data communication device according to claim 5, wherein only one copy of the Next Hop Array is saved.

7. The method for forwarding the service in the data communication device according to claim 5, wherein the private data comprises at least one of: an inner layer label of a virtual private network of a Route Prefix, a QoS parameter, and autonomous domain number information.

8. The method for forwarding the service in the data communication device according to claim 5, wherein the data communication device is a router.

9. An apparatus for forwarding a data communication service, comprising:

a storage unit, for saving a fast forwarding table, FIB, the FIB comprising a Route Prefix, and a pointer pointing to a Next Hop Array corresponding to the Route Prefix; wherein the pointer comprises a flag bit adapted to determine whether to add a private domain to the Route Prefix according to a value of the flag bit;

a forwarding unit, for querying the private data of each Route Prefix and the Next Hop Array corresponding to the Route Prefix from the FIB and forwarding a data packet in the data communication device according to a query result, if it is determined to add a private domain to the Route Prefix according to a value of the flag bit.

10. The apparatus for forwarding the data communication service according to claim 9, wherein a part of the storage unit is a memory of the data communication device; and the forwarding unit queries the corresponding Next Hop Array from the memory according to the pointer of the Route Prefix.

11. The apparatus for forwarding the data communication service according to claim 10, wherein the Next Hop Array is saved in only one copy in the memory.

12. The apparatus for forwarding the data communication service according to claim 9, wherein the private data comprises at least one of: an inner layer label of a virtual private network of a Route Prefix, a QoS parameter, and autonomous domain number information.

13. An apparatus for forwarding a data packet in a data communication device, comprising:

a storage unit, for saving a fast forwarding table, FIB, the FIB comprising a Route Prefix and a pointer pointing to a Next Hop Array corresponding to the Route Prefix; wherein the pointer comprises a flag bit adapted to determined whether to use the private domain of the Route Prefix according to a value of the flag bit when a private domain has been reserved for each Route Prefix; wherein the private domain is adapted to save the private data of the Route Prefix; and a forwarding unit, for querying the private data of each Route Prefix and the Next Hop Array corresponding to the Route Prefix from the FIB and forwarding a data packet in the data communication device according to a query result, if it is determined to use the private domain of the Route Prefix according to a value of the flag bit.

14. The apparatus for forwarding the data communication service according to claim 13, wherein the Next Hop Array is saved in only one copy in the memory.

15. The apparatus for forwarding the data communication service according to claim 13, wherein the private data comprises at least one of: an inner layer label of a virtual private network of a Route Prefix, a QoS parameter, and autonomous domain number information.

* * * * *